United States Patent [19]

Abellana et al.

[11] Patent Number: 5,060,741
[45] Date of Patent: * Oct. 29, 1991

[54] PLATEN MODULE FOR A MODULAR MAILING MACHINE

[75] Inventors: Jovito Abellana, Trumbull; Donald T. Dolan, Ridgefield, both of Conn.

[73] Assignee: Pitney Bowes Inc., Stamford, Conn.

[*] Notice: The portion of the term of this patent subsequent to Dec. 12, 2006 has been disclaimed.

[21] Appl. No.: 384,120

[22] Filed: Jul. 24, 1989

[51] Int. Cl.$^5$ .................. G01G 23/38; G01G 23/22
[52] U.S. Cl. .................................... 177/4; 101/91; 101/93.41; 400/649
[58] Field of Search ................. 400/649, 656; 101/93.41, 91; 177/4, 25.15

[56] References Cited

U.S. PATENT DOCUMENTS

| | | | |
|---|---|---|---|
| 3,837,461 | 9/1974 | Waibel | 400/656 X |
| 4,227,819 | 10/1980 | Manriguez | 400/656 X |
| 4,519,048 | 5/1985 | Abellana et al. | 101/93.41 X |
| 4,886,132 | 12/1989 | Dannatt | 101/91 X |
| 4,929,106 | 5/1990 | Buan et al. | 400/649 |

FOREIGN PATENT DOCUMENTS

| | | | |
|---|---|---|---|
| 19567 | 1/1985 | Japan | 400/656 |
| 2175854 | 12/1986 | United Kingdom | 400/656 |

*Primary Examiner*—Clifford D. Crowder
*Attorney, Agent, or Firm*—Charles G. Parks, Jr.; David E. Pitchenik; Melvin J. Scolnick

[57] ABSTRACT

A platen module is fixably mounted to the base of a modular mailing machine. A support wall is fixably mounted to the base. Also fixably mounted to the base of the mailing machine is a drive motor having an output shaft and plurality of gears fixably mounted to the respective ends of the output shaft. A guide rod is slidably mounted vertically to the support wall and a platen plate fixably mounted to the guide rod. A plurality of rack post are fixably mounted at one end to the platen plate and in constant mesh with a respective one of the gears.

4 Claims, 3 Drawing Sheets

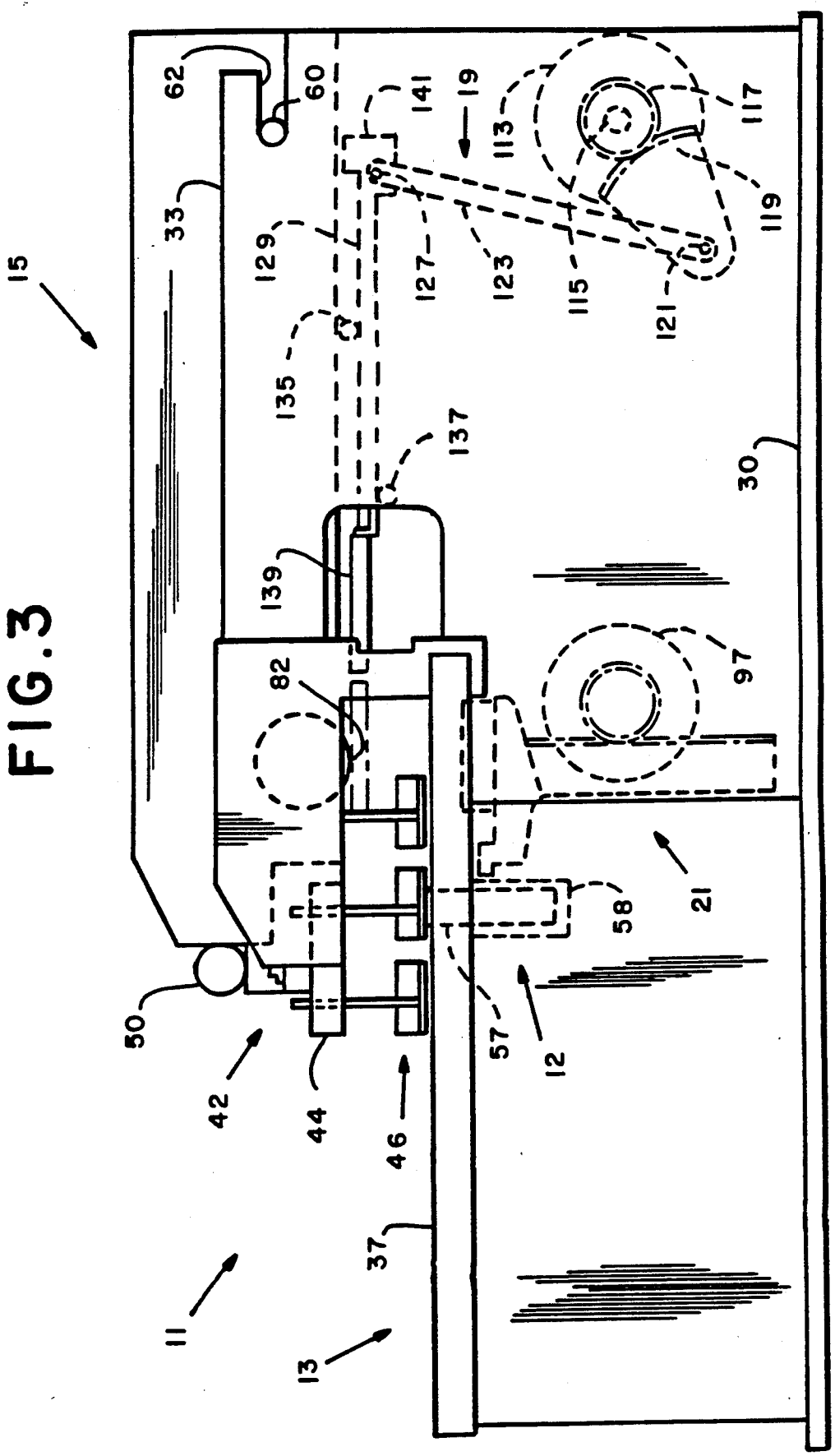

PLATEN MODULE FOR A MODULAR MAILING MACHINE

RELATED PATENTS

The following are related to the subject application and are commonly assigned: U.S. patent application Ser. No. 135,186, now abandoned; U.S. patent application Ser. No. 095,695, now abandoned; U.S. Pat. No. 4,872,521; and U.S. Pat. No. 4,886,132.

BACKGROUND OF THE INVENTION

This invention relates to flat-bed postage meter imprinting systems.

Conventionally, a flat-bed postage meter imprinting system is comprised of a base unit, commonly referred to as a mailing machine, which includes an envelope transport system and an inking system for wiping ink onto the indicia die of a postage meter. The postage meter is detachably mounted to the mailing machine.

The postage meter is detachably mounted to the mailing machine to facilitate it easily removal from the mailing machine for transport to the postal authorities for funds recharging of the meter. As a postage meter is a funds transfer system, postage meters are conventionally constructed as a secured mechanism. For security reasons, it is customary for such postage meters to include a single drive motor which is responsible for providing the drive force for setting meter printwheels and for actuating the platen which is a constituent component of the meter. The platen also functions as a die protection member when the meter is not in a print mode.

Because of the inclusion of the drive motor, which because of the plate torque requirement, is of substantial weight and size and the inclusion of an appropriate gear train required to selectively deliver motor output to the meter resetting system or platen actuation system, conventional meters have been characterized by these substantial weights. The considerable weight of such meter is considered disadvantageous in like of the need to transport the meter to and from the postal authorities and the required manipulation of the meter for funds charging.

SUMMARY OF THE PRESENT INVENTION

It is objective of the present invention to present a platen module for a novel mailing machine such that the mailing machine is suitable for employing a postage meter utilizing flat bed printing techniques. The mailing machine includes a transport assembly for properly positioning an envelope in the process station. The platen module is mounted to the base of the mailing machine just below the register area of a postage meter. The platen module includes a support wall mounted to the mailing machine base. A plurality of C-brackets and guide pins mounted to one face of the support wall define a vertical path. A platen guide rod is captured by the C-brackets and guide pins. A platen plate is fixably mounted to platen guide rod. Mounted to the platen plate in laterally spaced relationship is a first and second rack post. Fixably mounted atop the platen plate is a elastomeric material having a generally rectangular shape of uniform thickness.

A drive motor is mounted to and between parallel support brackets such that the rack posts are outboard of the respective brackets. The drive motor includes a drive shaft. The drive shaft has a gear mounted to its ends in constant mesh with a respective rack post. Actuation of the drive motor 97 can cause the rack post to elevate the platen plate to bring the elastomeric member into engagement with a properly positioned envelope in the meter register projection area and, in so doing, cause an indicia to be imprinted on the envelope.

The mailing machine includes meter support posts which support the meter such that the meter die is positioned over the platen. The meter is detachably mounted to the support post for easy removal.

BRIEF DESCRIPTION OF THE DRAWINGS

FIG. 3 is a side elevational view of the mailing machine.

DETAILED DESCRIPTION OF THE PREFERRED EMBODIMENT

The novel postage meter mailing machine particularly suited for employment of the present invention employs a novel modular architecture. That is, the mailing machine is comprised of subsystems which are general self-contained structural systems. Therefore, the mailing machine can be configured to include only those subsystems modules necessary to meet particular operational needs for a given application environment or, alternatively, the mailing machine can be configured to include the full array of subsystems modules providing maximum application flexibility. For example, where the used environment is restricted to processing uniform mail, a scale module may be omitted in substantial portion from the mailing machine without affecting the system performance of remaining or the system controller.

Figure 1:
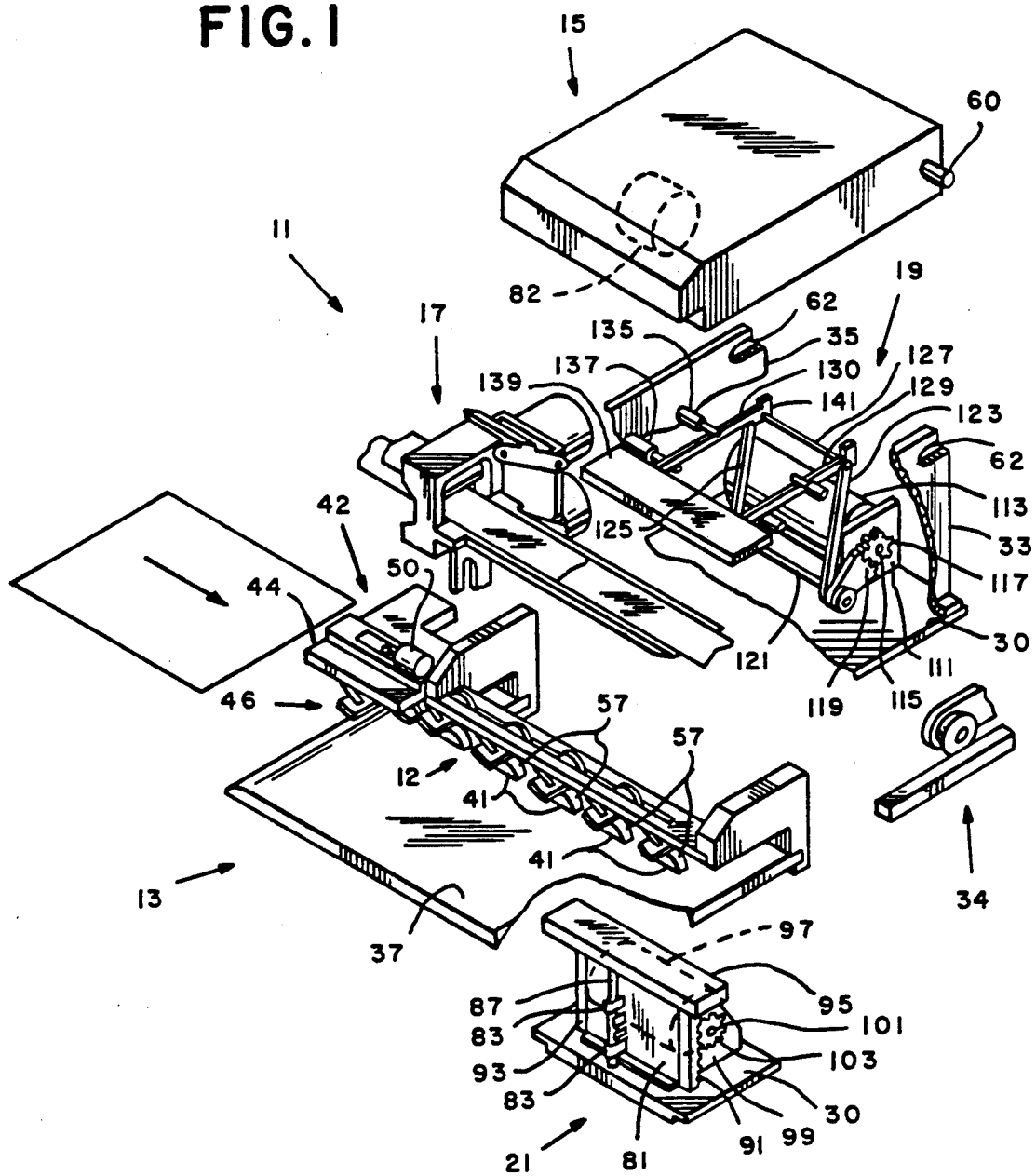
Fig 1 is a sectioned exploded view of a mailing machine in accordance with the present invention.
Figure 2:
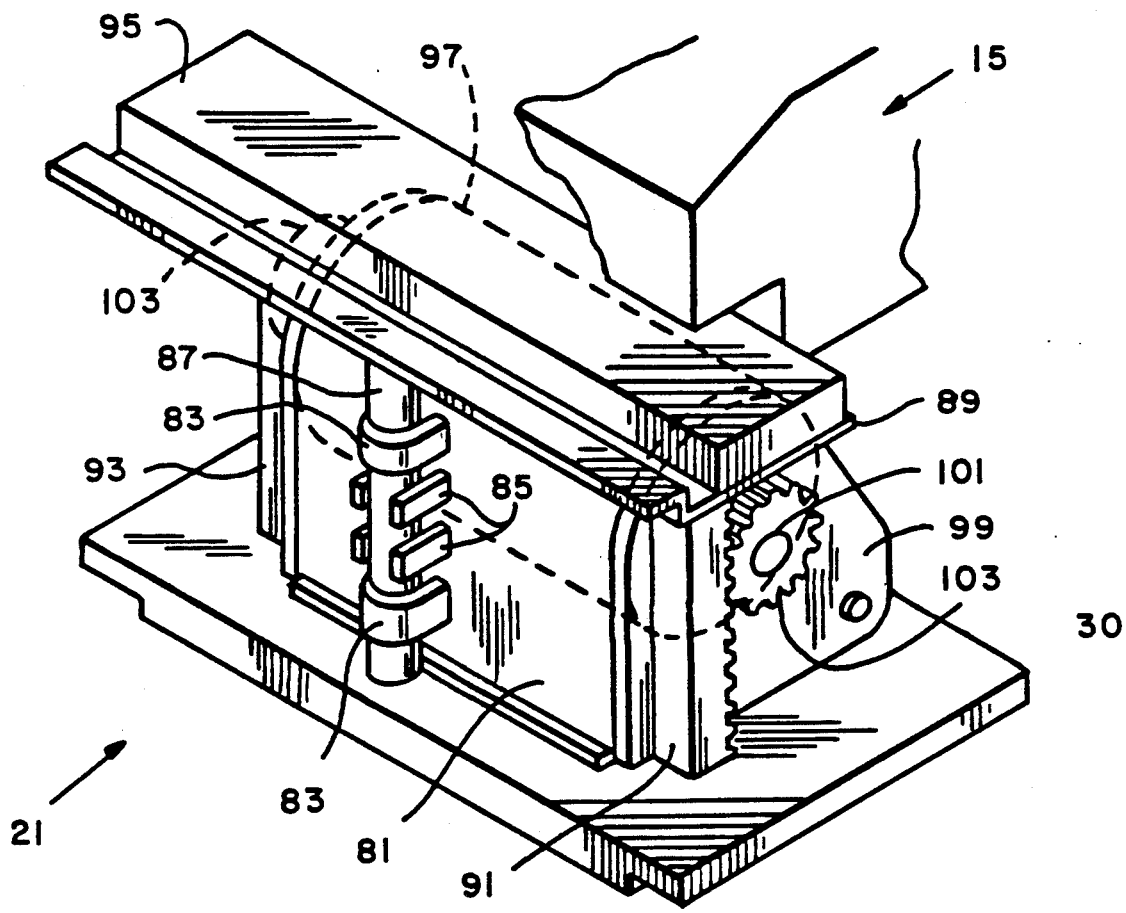
FIG. 2 is a perspective view of a platen module in accordance with the present invention.

Referring to the FIG. 1, a mailing machine, generally indicated as 11, employs novel system subsystems modular architecture comprising a scale module 13, a transport module 12, a postage meter module 15, a tape feed module 17, a inking module 19, and a platen module 21. The modules are located within the mailing machine 11 such that the scale module 13 is located frontwardly of parallel support walls 33 and 35 of the mailing machine 11. The support walls 33 and 35 are fixably mounted to the mailing machine base 30 in lateral spaced apart relationship. Mounted to the base plate 30 between the support walls 33 and 35 is the ink module 19. Mounted above the ink module 19 to the support walls 33 and 35 is the postage meter module 15. The platen module 21 is mounted to the base 30 just below a registration portion of the postage meter 15, to be described more fully later. In addition, the mailing machine has mounted to the wall 35 the tape feed module 17 of the present invention coactive in the preferred embodiment with a tape cutting mechanism 34.

A scale module 13 most suited for the present invention is of the resilient type more fully described in co-pending application Serial No. 073,790, filed July 7, 1987, entitled APPARATUS AND METHOD OF DETERMINING THE MASS OF AN ARTICLE BY MEASURING THE SHIFT IN THE PERIOD OF HARMONIC MOTION, now U.S. Pat. No. 4,778,018 herein incorporated by reference. Briefly, the resilient type scale, most suited and described in the noted applications, utilizes the principles of harmonic vibration for the purpose of determining the weight of an article.

It is noted that as viewed in FIG. 1, the preferred embodiment of the present invention includes a sealing module, generally indicated as 42. The sealing module 42 is comprised of a generally L-shaped support member 44. The support member 44 is fixably mounted at one end to the mailing machine base 30 (in a manner not shown). The other end of the support member 44 rotatably supports a plurality of sealing members 46 biased downwardly by an conventional means. The sealing members 46 are aligned longitudinally in a generally staggered relationship. A solenoid 50 is fixably mounted to the support member 44 to cause the sealing members 46 to rotate to a spaced apart relationship to the weighing plate 37 of scale 13 during the weighing process.

Referring more particularly to FIG. 3, the transport module 12 is comprised of a plurality of first guide rollers 57 which are rotatably mounted to a suitable frame generally indicated as 58. The rollers 57 are generally positioned through slots 41 in the weighing plate 37.

Referring more particularly, to FIG. 3, the postage meter 15 includes side tabs 60 which are slideably received in a respective C-slot 62 formed in respective support walls 33 and 35. The meter 15 then rests on inker guide tabs 135 from in respective walls 33 and 35. The meter 15 can be removed from between the support walls 33 and 35 by merely lifting the meter and sliding tabs 60 from slots 62. It is noted that a suitable postage meter having a suitable setting mechanism is described in U.S. Pat. No. 4,953,996, entitled PRINTWHEEL SETTING DEVICE FOR A POSTAGE METER, herein incorporated by reference.

The postage meter includes a forwardly located registration area, generally indicated as 82. Mounted to the base 30 of the mailing machine just below the register area 82 of the postage meter 15 is the platen module 21. The platen module 21 includes a support wall 81 fixably mounted to the base 30. A plurality of C-brackets 83 and guide pins 85 are fixably mounted to one face of the support wall 81 in vertical alignment to allow a platen guide rod 87 to vertically slide along a defined vertical path. A platen guide rod 87 is laterally captured by the C-brackets 83 and guide pins 85 and has fixably mounted to its top a platen plate 89. Also fixably mounted to the platen plate in laterally spaced relationship is a first and second rack post 91 and 93, respectively. Fixably mounted atop the platen plate 89 is a elastomeric material 95 having a generally rectangular shape of uniform thickness.

A drive motor 97 is mounted to and between parallel support brackets 99 such that the rack posts 91 and 93 are outboard of the respective brackets 99. The drive motor 97 includes a drive shaft 101 which extends axially through the drive motor 97. At each end of the drive shaft 101 is fixably mounted a gear 103 aligned to be in constant mesh with respective rack posts 91 and 93. It is now appreciated that actuation of the drive motor 97 can cause the rack post to elevate the platen plate 89 to bring the elastomeric member 95 into engagement with a properly positioned envelope in the meter register projection area and, in so doing, cause an indicia to be imprinted on the envelope.

Referring now to FIGS. 1 and 3, an inking module 19 is located between the support walls 33 and 35 of the mailing machine 11. A mounting plate 111 is fixably mounted vertically to the base plate 30. A drive motor 113 is fixably mounted to the mounting plate 111 such that the output shaft 115 extends through the plate 111. Fixably mounted around one end of the output shaft 115 outboard of the plate 111 is a gear 117. A second gear 119 is pivotally mounted to the base 30 in constant mesh with gear 117. A linkage assembly comprised of a first link 121 is fixably mounted to the second gear 119 at one end. Fixably mounted along the first link 121 is a second link 123 and a third link 125 in spaced apart parallel orientation a fourth link 127 is pivotally mounted at its respective ends to respective link 125 and 123. A first and second transfer link 129 and 130, respectively, are pivotally mounted in spaced apart relationship at one end to the fourth link 127. Fixably mounted inboard to each of the support walls 33 and 35 is a first guide pin 135 and a second guide pin 137.

Each of the transfer links 129 and 130 extend respectively below a guide pin 135 and above a guide pin 137 such that the guide pins 135 and 137 act to guide the longitudinal displaceable path, respectively, of the transfer links 129 and 130. The guide pins 135 and 137 also provide vertical support. Fixably mounted to the forward end of each of the transfer links is a ink pad well 139 in which a ink pad resides (now shown). At the other end of each of the transfer links 129 and 130 is formed a tilting surface 141. It can therefore be appreciated that upon actuation of the motor 113 the linkage assembly is driven forwardly. The pins 135 are positioned such that when the ink pad tray 139 is positioned just below the register area 82 of the meter 15 the tilt surface 141 are brought into forced engagement with the pin 135 causing the transfer links 130 and 129 to be tilted upwardly elevating the ink pad well 139 into engaging contact with the register area 82 of meter 15.

It should now be well appreciated that the invention as aforedescribed has been described in its preferred embodiment and in its preferred environment and the description should not be taken as limiting.

What is claimed is:

1. In an improved mailing machine having a base supporting a scale having a weighing plate, said weighing plate having a peripheral recess, and said mailing machine detachably supporting a postage meter having a printing surface such that said postage meter printing surface is in spaced apart alignment to said recess, wherein the improvement comprises:
   a platen plate sized to travel through said recess;
   a platen plate support means for supporting said platen plate in a first position and in an elevated second position, said platen plate support means having,
   a rack post fixably mounted at one end to an underside of said platen plate;
   guide means for guiding and confining the displacement of said platen plate to a defined path such that in said elevated second position said platen plate is positioned in close proximity to said printing surface of said postage meter through said recess; and,
   a drive motor means mounted in said mailing machine for driving said rack post such that said platen plate is positionable between said first and second position.

2. In an improved mailing machine having a base supporting a scale having a weighing plate, said weighing plate having a peripheral recess, and said mailing machine detachably supporting a postage meter having a printing surface such that postage meter printing surface is in spaced apart alignment to said recess, wherein the improvement comprises:
- a platen plate sized to travel through said recess;
- an elastomeric member fixably mounted to a fixed surface of said platen plate; and
- a platen plate support means for supporting said platen plate in a first position and in an elevated second position, said plate support means having,
  - a support wall fixably mounted to the base of said mailing machine;
  - a rack post fixably mounted at one end to the underside of said platen plate;
  - means for guiding and confining the displacement of said platen plate to a defined path such that in said elevated second position said platen plate and said elastomeric member are positioned in close proximity to said printing surface of said postage meter; and,
  - a drive motor having an output shaft fixably mounted to the base of said mailing machine having a gear fixably mounted to said output shaft of said motor and in constant mesh with said rack post.

3. In an improved mailing machine having a base supporting a scale having a weighing plate, said weighing plate having a peripheral recess, and said mailing machine having means for detachably mounting a postage meter having a printing surface such that said postage meter's printing surface is in spaced apart alignment to said recess, wherein the improvement comprises:
- a platen module having, a support wall fixably mounted to said base of said mailing machine, a drive motor fixably mounted to said base and having an output shaft, a plurality of gears fixably mounted to the respective ends of said output shaft, a guide rod slidably mounted vertically to said support wall, a platen plate fixably mounted at one end for said guide rod, and a plurality of rack posts fixably mounted at one end to said platen plate and in constant mesh with a respective one of said gears.

4. In an improved mailing machine having a base supporting a scale having a weighing plate, said weighing plate having a peripheral recess, and said mailing machine having means for detachably mounting a postage meter having a printing surface such that said postage meter printing surface is in space apart alignment to said recess, wherein the improvement comprises:
- a platen plate sized to travel through said recess;
- a platen plate support means for displaceably supporting said platen plate in a first position and in an elevated second position, such that said platen plate traverse said recess to said second position in close proximity to said print surface of said postage meter; and,
- a drive motor means for drivably displacing said platen plate support means from said first position to said second position and returning said displacement means to said first position.

* * * * *